Nov. 15, 1966    M. HUBER    3,285,587
EXCHANGE TOWER
Filed March 16, 1964    2 Sheets-Sheet 1
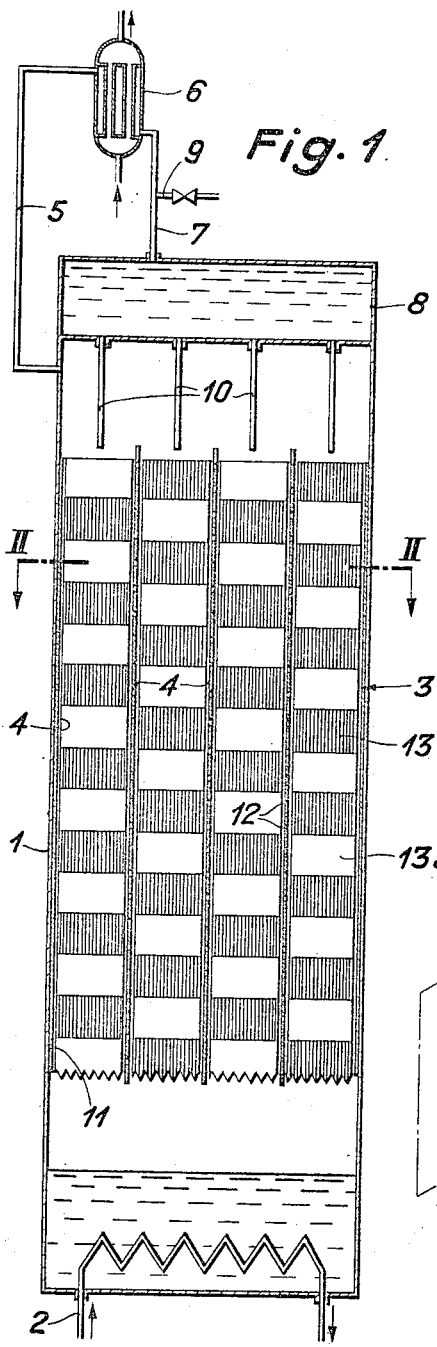
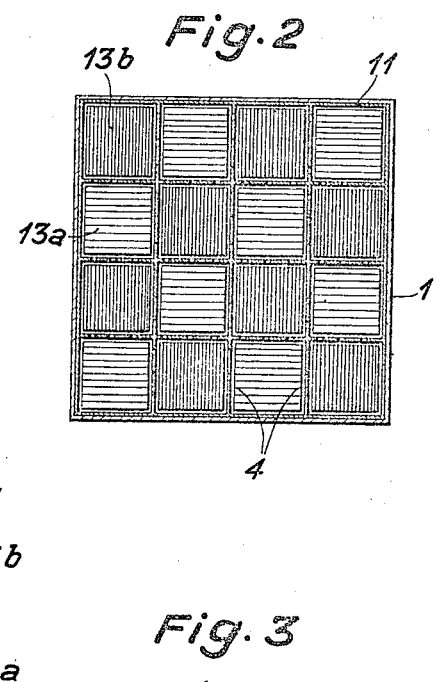
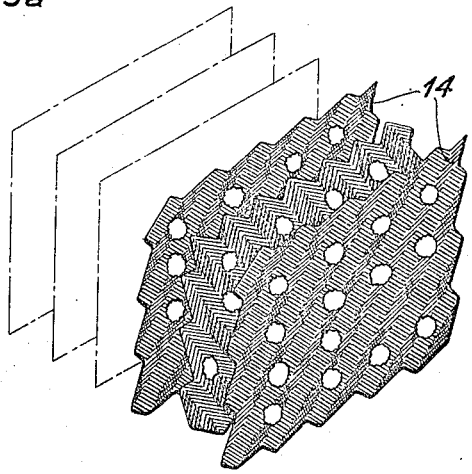
Inventor:
Max Huber
BY Pennie, Edmonds,
Morton, Taylor and Adams
ATTORNEYS Nov. 15, 1966　　　　　M. HUBER　　　　　3,285,587
EXCHANGE TOWER Filed March 16, 1964　　　　　　　　　　　　2 Sheets-Sheet 2

Inventor:
Max Huber
BY Pennie, Edmonds,
Morton, Taylor and Adams
ATTORNEYS

United States Patent Office 3,285,587
Patented Nov. 15, 1966

3,285,587
EXCHANGE TOWER
Max Huber, Winterthur, Switzerland, assignor to Sulzer Brothers Limited, Winterthur, Switzerland, a Swiss company
Filed Mar. 16, 1964, Ser. No. 351,976
Claims priority, application Switzerland, Mar. 22, 1963, 3,675/63
3 Claims. (Cl. 261—96)

The present invention relates to exchange towers or columns traversed in opposite directions by a liquid and by a gaseous or vaporous medium, the exchange portion of the column including packing bodies therein.

Exchange columns of this kind may be used for distillation or rectification, or for extraction or absorption of a component from a gaseous mixture by means of a distinct separating fluid operating in material exchange relation with the gaseous mixture. They may also be used for the recovery of isotopic elements out of a material, on the basis of a chemical exchange reaction. The separation of deuterium and hydrogen is an example. The separation of molecules formed of unlike isotopes, for example the separation of heavy and light water, can of course also be carried out by means of such exchange columns.

It is an object of the invention to improve the operation of material exchange columns, at minimum apparatus cost. The invention is based upon recognition of the fact that high efficacity, and in particular a high coefficient of separation, will be achieved if an intensive mixing of the gaseous or vaporous medium is achieved throughout the entire cross-section of the column.

This requirement is achieved according to the invention by the use of packing bodies imposing various pressure drops on the gaseous medium flowing through the column, these bodies being so distributed over the cross-section of the column and over the height thereof that a zigzag path is imposed on the gaseous medium in its travel through the column from the bottom to the top thereof.

In applying the invention to a material exchange column having parallel streaming conduits defined at least in part by perforated partitions of a cellular structure, it is advantageuos to dispose in the conduits packing bodies having such various pressure drop properties, while retaining in the channels approximately the same theoretical plate height. The dimensions of these packing bodies are matched to the cross-section of the streaming conduits and the bodies comprise at least in part contacting corrugated plates with the corrugations of adjacent plates extending in directions inclined to each other, at least one of said directions being inclined to the vertical axis of the column. Achievement of various pressure drops among the packing bodies can be achieved by employing packing bodies having various orientations for the corrugations of their plates, the bodies whose plates possess corrugations more nearly parallel to the vertical axis of the column imposing smaller pressure drops or gradients than do the bodies whose plates possess corrugations inclined at larger angles to the column axis.

According to another embodiment of the invention, the variation in pressure drop impoed by the packing bodies is achieved by variation in the width of the corrugations, bodies of which the plates have corrugations of large width imposing a smaller pressure drop than do those of which the corresponding dimension is smaller.

The invention is not limited to material exchange columns having packing bodies of this type. For example the so-called known Raschig rings may also be employed, having either perforate or imperforate walls.

The invention will now be further described in terms of a number of non-limitative examples by reference to the accompanying drawings in which:

FIG. 1 is a vertical section through a rectifying column which can, for example, serve to separate light from heavy water;

FIG. 2 is a cross-section through the column of FIG. 1 taken on the line II—II of FIG. 1;

FIG. 3 shows in perspective the plates of a filler or packing body in accordance with the invention.

Figure 4:
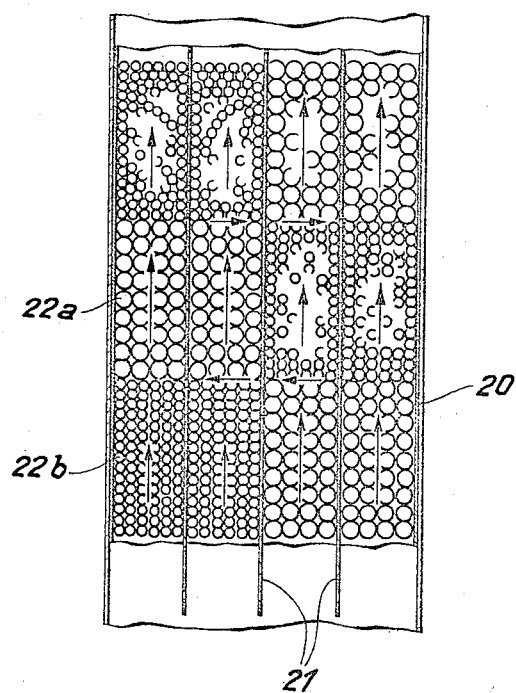
FIG. 4 shows schematically a fragmentary vertical section of a material exchange column according to the invention employing Raschig rings of various pressure drop properties in sets through the various streaming conduits.

The rectifying column of FIG. 1 posseses a rectangular cross-section as illustrated in FIG. 2 and may be employed for forced rectification. The mixture to be rectified is disposed in the bottom part of the column and is vaporized by means of a heating coil 2. The vaporous mixture so formed flows upwardly through the exchange portion of the column, generally indicated at 3 and to be described in detail hereinbelow, where it flows in material exchange relation with the liquid flowiing downwardly through the streamng conduits 4. The vaporous product recovered, which in the case of rectification comprises the more volatile components of the mixture, leaves the column through a line 5 and is condensed in a back-flow condenser 6. A portion of the condensate is recycled into a tank 8 at the upper end of the column, whereas another fraction is withdrawn through line 9.

The recycled fraction is distributed out of the tank 8 through a distributor constituting capillary tubes 10 over the cross-section of the plural streaming channels or conduits 4.

The streaming conduits are defined by a partition material 11 having a cellular structure. This material is assembled to give to the conduits a rectangular cross-section and the partition walls exhibit apertures 12 for exchange of the vaporous medium between adjacent conduits.

The partitions may be made of sheet material, either metallic or synthetic.

The streaming conduits contain superposed packing bodies 13a and 13b of dimensions matched to the cross-section of the streaming conduits. In the example illustrated (FIG. 3), the bodies are made up of corrugated plates 14 in contact with each other, and with the corrugations of adjacent plates inclined to each other and to the axis of the column. The packing bodies, whose plates are apertured in order to achieve a desirable distribution of the gaseous material over the cross-section of the packing bodies, may be made of metal or of synthetic material, preferably of a material which is self-wetting and textured or fibrous in nature.

Two types of packing bodies having unlike pressure drop imposing properties are used in the column to fill the streaming conduits. Thus bodies 13a having a large width for their corrugations make up the packing bodies imposing a low pressure drop, while bodies 13b having a small corrugation width make up the packing bodies imposing a large pressure drop. These two types are distributed or intermingled in checker-board fashion, both cross-wise and vertically of the column as indicated in FIGS. 1 and 2. For simplicity these figures show only the orientation of the planes to which the plates conform. In actuality, as shown in FIG. 3, the plates are in addition corrugated. As may moreover be seen from the drawing, adjacent packing bodies are disposed with the planes of their plates transversely to each other, e.g. at 90°, in order to improve the distribution of the descending liquid medium over the cross-sections of the plural conduits. In this way, since the packing bodies having large pressure drop properties present a larger resistance to the passage of the gaseous medium than do those of smaller pressure drop properties, there is imposed a zigzag-shape on the paths by which the gaseous medium moves vertically through the column. In this way there is achieved the desired distribution and mixing of the gaseous medium along the length or height of the column and over its entire cross-section.

FIG. 4 is a fragmentary section of a material exchange column 20 whose exchange portion, as in the embodiment of FIG. 1, comprises a material of cellular structure defining a plurality of parallel streaming conduits limited by partitions 21. These conduits are filled with Raschig rings of various diameters, disposed in successive layers which are moreover staggered as between various parts of the cross-section of the column, as indicated in FIG. 4, where layers of rings of large diameter in the two left-hand conduits are, as regards their position vertically of the column, adjacent to layers of rings of small diameter in the two right-hand conduits, and vice versa.

In the sections 22a containing rings of large diameter, the pressure drop imposed upon the rising vapor is smaller than in sections 22b which contain Raschig rings of smaller diameter. By reason of the successively offset arrangement of the packing bodies just described, there is imposed upon the vapor in its rise through the column a zigzag path as indicated by the combination of horizontal and vertical arrows in FIG. 4.

It will thus be seen that the invention provides an exchange column or tower comprising a housing, and a plurality of perforated partitions making up a honeycomb-like structure and dividing at least part of the interior of the housing into contiguous adjacent channels. These channels contain packing materials of at least two types, imposing unlike pressure drops on a gaseous medium streaming therethrough in its passage from the bottom to the top of the tower. These packing materials are distributed in the channels so as to impose a zigzag motion on the gaseous medium in its upward travel through the tower. Preferably, the packing materials of unlike resistance to gas passage are alternated in each channel with a staggered relation from channel to channel transversely of the tower.

While the invention has been described herein in terms of a number of preferred embodiments, the invention itself is not limited thereto but comprises all modifications and variations of the structures hereinabove described which fall within the spirit and scope of the claims.

I claim:

1. An exchange tower comprising a housing, apertured partition means in said housing defining a plurality of parallel conduits having apertured walls, and plural packing bodies disposed in each of said conduits, said packing bodies substantially filling the cross-section of said conduits respectively and comprising each at least in part corrugated plates with the corrugations of adjacent plates inclined to each other and with corrugations of at least one of two adjacent plates being inclined to the axis of the tower, said bodies being of two classes differing in their resistance to flow of a gaseous medium but having substantially the same theoretical plate height.

2. An exchange tower according to claim 1 wherein the bodies of said two classes differ in the width of the corrugations of their plates.

3. An exchange tower according to claim 1 wherein the bodies of said two classes differ in the inclination to the lower axis of the corrugations of their plates.

References Cited by the Examiner

UNITED STATES PATENTS

| 2,152,574 | 3/1939 | Turner | 261—112 |
| 2,231,088 | 2/1941 | Richardson | 261—112 |
| 2,485,849 | 10/1949 | Simmons | 261—112 |
| 2,971,750 | 2/1961 | Boling | 261—140 X |
| 3,243,170 | 3/1966 | Ellis et al. | 261—94 |

FOREIGN PATENTS

| 470,713 | 6/1914 | France. |
| 1,318,149 | 1/1963 | France. |
| 337,284 | 5/1921 | Germany. |

ROBERT F. BURNETT, *Primary Examiner.*

RONALD WEAVER, *Examiner.*